G. R. BIMM.

DUST COLLECTING APPARATUS.

APPLICATION FILED JAN. 4, 1910.

Reissued Mar. 22, 1910.

13,096.

Witnesses:
Henry C. Hecht
Adolph G. Duse

Inventor
Georges Robert Bimm
By his Attorneys
Dunnstock

UNITED STATES PATENT OFFICE.

GEORGES ROBERT BIMM, OF PARIS, FRANCE.

DUST-COLLECTING APPARATUS.

13,096. Specification of Reissued Letters Patent. Reissued Mar. 22, 1910.

Original No. 878,329, dated February 4, 1908, Serial No. 364,543. Application for reissue filed January 4, 1910. Serial No. 536,437.

*To all whom it may concern:*

Be it known that I, GEORGES ROBERT BIMM, a citizen of the Republic of France, residing at Paris, in France, have invented new and useful Improvements in or Relating to Dust-Collecting Apparatus, of which the following is a specification.

This invention relates to apparatus for the removal of dust by suction and has for its object to provide an apparatus which can be manipulated by hand by the single person required to move the nozzle of the apparatus over the surface of the articles to be cleaned.

Figure 1:
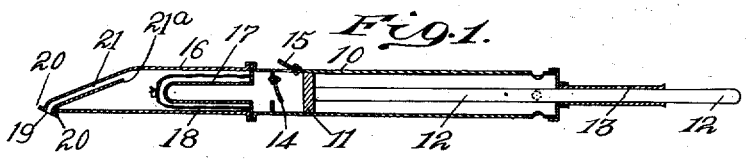
Figure 2:
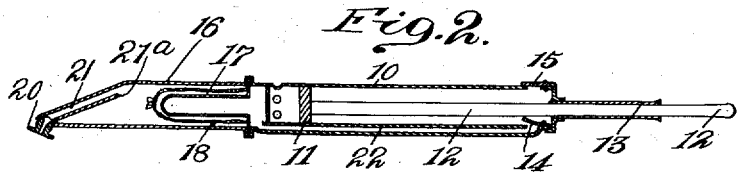
Figure 3:
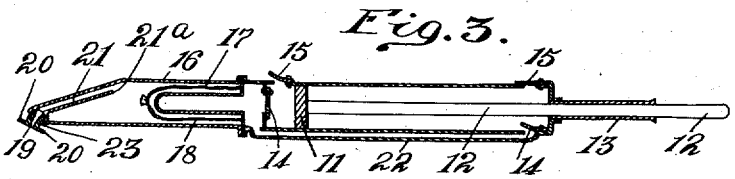
Figure 4:
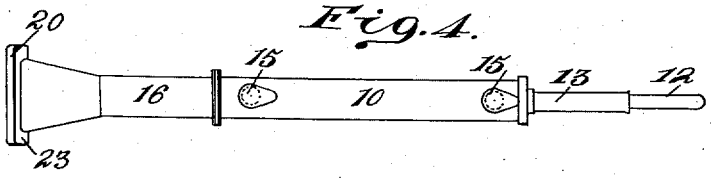

In the accompanying drawings which show three constructions according to this invention, Figures 1 to 3, are views in longitudinal section of three different constructions of the apparatus, and Fig. 4 is a plan of the construction shown in Fig. 3.

With reference to Fig. 1 manually operable air controlling mechanism is shown in the form of a pump body 10 provided with a piston 11 which can be manipulated by hand by means of a rod 12 freely guided by a socket or sleeve 13 which forms an extension on the upper end of the pump body 10. Air inlet and exhaust valves 14 and 15 respectively are also formed in the pump body 10. To the lower end of the pump body 10 is connected in an air tight manner a nozzle chamber 16 within which is mounted a frame 17 provided with a filtering means in the form of a cloth 18 of very fine mesh through which air but not dust may pass. For simplifying the joint between the parts 10 and 16 the frame 17 is provided with a flange which is clamped between the members 16 and 10 when the various parts are assembled. In this construction as in that shown in Figs. 3 and 4 the chamber 16 has its free end flattened so as to present a nozzle orifice 19 of small width and of a comparatively great length. The orifice 19 is provided with flanges 20 suitably bent to enable the apparatus to be moved along the articles to be cleaned without scratching or catching in them.

It will be understood that if the piston 11 is reciprocated in the pump body 10, when the piston is moved away from the valve 14, air will be drawn in through the latter after having passed through the conduit 21, chamber 16 and the filter 18, while at the opposite movement of the piston 11, the air drawn into the body 10, will be discharged through the valve 15. The air drawn through the orifice 19 by the suction stroke will carry with it into the chamber 16, any dust situated on the surface of the articles along which the flanges 20 are moved and the air will be freed from dust during its passage through the filter 18. The air discharged through the valve 15 immediately behind the filter 18 will thus be quite free from dust.

It must be pointed out that, owing to the large surface offered by the elongated shape of the frame 17 on which is mounted the filtering cloth 18, the resistance to the suction produced by the presence of the said cloth 18 is insignificant, and the operation of the piston is greatly facilitated by it.

Fig. 2 shows a construction of apparatus in which suction can be produced in a chamber arranged along the body of the pump 10. To that end, a conduit 22 connects the front portion of the pump body 10 to its rear portion, the piston rod 12 passes in an air tight manner through the sleeve 13 and the suction and discharge valves 14 and 15 are arranged in the rear portion of the body 10.

In the modification illustrated in Figs. 3 and 4, the conduit 22 is provided as in the construction shown in Fig. 2, the rod 12 is again mounted in an air tight manner in the sleeve 13 and further a pair of valves 14 and 15 are arranged at each end of the body 10, so that the apparatus is a double acting one, that is to say, it draws in dust laden air and discharges pure air at each stroke of the piston 11. Moreover, in the construction shown in Figs. 2 and 3, the nozzle member 23 of the apparatus which is provided with flanges 20 and orifice 19, is mounted on the chamber 16 in such manner that it can oscillate relatively to the latter and so enables the chamber to follow any involuntary movement imparted to it by the operator without raising the flanges 20 from the article being cleansed.

In the various constructions according to this invention, the dust accumulates in the bottom portion of the chamber 16 and is removed from time to time by disconnecting the parts 10 and 16. The arrangement of the conduit 21 which opens at the upper portion of the chamber 16, prevents dust from falling back through the suction orifice 19 after it has accumulated on the bottom of the chamber 16. The lower wall of the conduit 21 forms with the casing 16 a dust trap which effectually prevents the dust from escaping from the chamber 16 through the conduit 21. It will be obvious that when the device of my invention is in use it will be held in a slightly inclined position from the vertical and therefore the dust particles will lodge in the closed portion of the casing at the nozzle end thereof. The wall 21[a], which together with the upper wall of the casing 16, forms the conduit 21 is conveniently recessed to receive the cylindrical head of the nozzle 19 and the upper wall of the casing 16 extends over said head and retains the same in said recess.

Having now particularly described and ascertained the nature of my said invention and in what manner the same is to be performed I declare that what I claim is:

1. A portable dust collecting apparatus comprising in combination, a pump, a nozzle chamber communicating with said pump, a nozzle movably mounted on said chamber and adapted to be moved abreast of the surface to be cleaned, and an air filter interposed between said pump and chamber.

2. A portable dust collecting apparatus comprising in combination, a nozzle chamber provided with a nozzle and a wall forming with the upper wall of said chamber a conduit and with the lower wall of said chamber a dust trap, and a pump communicating with said chamber.

3. A portable dust collecting apparatus comprising in combination, a nozzle chamber provided with a nozzle and a wall forming with one wall of said chamber a conduit and with another wall thereof a dust trap, said wall and the walls of said chamber being recessed, said nozzle being movably mounted in said recess, and a pump communicating with said chamber.

4. A portable dust collecting apparatus comprising in combination, a pump, a nozzle chamber communicating with said pump and provided with a dust trap, and a nozzle movably mounted on said chamber and adapted to be operated abreast of the surface to be cleaned.

5. A portable dust collecting apparatus comprising in combination a pump, a nozzle chamber communicating with said pump, an air filter interposed between said pump and said chamber, a substantially oblong shaped nozzle provided with bearing flanges and an orifice extending in the direction of its longer axis; said nozzle being movably connected to the lower end of said nozzle chamber, and a communication between said orifice and said nozzle chamber.

6. A portable dust collecting apparatus comprising in combination a pump, a nozzle chamber communicating with said pump, an elongated filter interposed between said pump and said chamber, and an oblong shaped nozzle, provided with bearing flanges and an orifice therebetween extending in the direction of its longer axis, a pivotal support for said nozzle permitting it to oscillate about its longer axis, and a communication between said orifice and the nozzle chamber.

In witness whereof I haxe affixed my signature, in presence of two subscribing witnesses.

GEORGES ROBERT BIMM

Witnesses:
AUGUSTE BIMM,
S. SAPAIRY.